(12) United States Patent
McDavitt et al.

(10) Patent No.: US 7,079,910 B1
(45) Date of Patent: Jul. 18, 2006

(54) MANUFACTURING PROCESS BILLING SYSTEM

(75) Inventors: Brian P. McDavitt, Portland, OR (US); Charles R. Szmanda, Westborough, MA (US); James R. Shelnut, Northboro, MA (US)

(73) Assignee: Shipley Company, L.L.C., Marlborough, MA (US)

( * ) Notice: Subject to any disclaimer, the term of this patent is extended or adjusted under 35 U.S.C. 154(b) by 1274 days.

(21) Appl. No.: 09/723,302

(22) Filed: Nov. 27, 2000

(51) Int. Cl.
*G06F 19/00* (2006.01)

(52) U.S. Cl. .................... 700/107; 700/106
(58) Field of Classification Search .............. 700/90, 700/95, 96, 97, 99, 100, 101, 102, 103, 104, 700/106, 107, 108, 117; 705/20, 29
See application file for complete search history.

(56) References Cited

U.S. PATENT DOCUMENTS 5,659,478 A * 8/1997 Pennisi et al. ................ 700/95
5,854,746 A * 12/1998 Yamamoto et al. ......... 700/106
6,009,406 A * 12/1999 Nick ............................ 705/10
2004/0190369 A1* 9/2004 Cosman et al. .......... 366/152.1

* cited by examiner

*Primary Examiner*—Leo Picard
*Assistant Examiner*—Chad Rapp
(74) *Attorney, Agent, or Firm*—Marisa J. Dubuc; S. Matthew Cairns

(57) ABSTRACT

A method and system is provided for improving the efficiency of a process for manufacturing a product and begins with the step of receiving from a manufacturer a desire to manufacture a number of said products. Next, the amount of materials that is required to produce the number of products is determined. Next, the optimum process for manufacturing the number of products is determined. Next, a cost to manufacture the number of products based on the amount of materials and the optimum process is calculated. The manufacturer is then provided with the optimum process and the cost to manufacture the number of products. Finally, a payment is received from the manufacturer that is proportional to the cost to manufacture the number of products.

12 Claims, 1 Drawing Sheet

MANUFACTURING PROCESS BILLING SYSTEM

BACKGROUND

The following invention relates to a system and method for improving the efficiency of a manufacturing process and, in particular, to a system and method that enables manufacturers to efficiently select and use materials in a manufacturing process.

The manufacture of goods generally requires the selection of suitable materials and knowledge of a process for converting the materials into the desired goods. For example, the manufacturing of integrated circuits requires the manufacturer to select the appropriate wafers and chemicals and process the wafers using the chemicals in a manner that produces the desired integrated circuits. A challenge in most manufacturing processes is to select the type and quantity of materials so as to minimize the resulting cost of the manufactured goods. This is especially the case in situations, such as the manufacturer of integrated circuits, where the cost of the materials is a significant percentage of the overall cost of the final product. In these situations, any materials wasted would cause the cost-per-unit-manufactured to become unacceptably high.

In many manufacturing processes, the responsibility of selecting the appropriate type and quantity of materials rests on the manufacturer. For example, if a manufacturer desires to produce integrated circuits, then the manufacturer must determine which wafers and chemicals it requires, and in what quantity, as well as determine the optimal manufacturing process that should be used. In many cases, however, it is the materials provider and not the manufacturer that knows which are the best materials to use and what are the latest and most efficient processing techniques. As a result, the manufacturer either may resort to trial and error to optimize the manufacturing process or use a non-optimal process. In either case, materials are wasted resulting in an increase in the cost-per-goods produced.

Furthermore, in many instances, the materials providers are adversely affected by a manufacturer's incorrect selection and inefficient use of materials. First, if the manufacturer orders from a materials provider the incorrect materials for a certain manufacturing process, the material provider will often have to bear at least a part of the cost of providing the proper materials to the manufacturer in order to maintain goods customer relations. Also, to reduce the cost of the manufactured products, the manufacturer often tries to reduce the amount of materials used which necessarily results in decreased revenues to the material providers. Thus, the improper and inefficient use of materials in a manufacturing process results in an increased cost-per-unit-manufactured as well as adversely impacting the revenue stream that materials provider receive from the sale of materials.

Accordingly, it is desirable to provide a system and method that enables manufacturers to efficiently select and use materials in a manufacturing process and that also stabilizes the material costs associated with the manufactured goods.

SUMMARY OF THE INVENTION

The present invention is directed to overcoming the drawbacks of the prior art. Under the present invention a method and system is provided for improving the efficiency of a process for manufacturing a product and begins with the step of receiving from a manufacturer a desire to manufacture a certain amount of the product. Next, the amount of materials that is required to produce the amount of product is determined. Next, the process for manufacturing the number of products is determined. Next, a cost to manufacture the amount of product based on the amount of materials and the manufacturing process is calculated. The manufacturer is then provided with a description of the manufacturing process and the cost to manufacture the number of products. Finally, a payment is received from the manufacturer that is proportional to the cost to manufacture the number of products.

In an exemplary embodiment, the amount of materials that are required to produce the number of products is provided to the manufacturer.

In another exemplary embodiment, the manufacturer is provided with a tool that is required to implement the manufacturing process.

Accordingly, a method and system is provided that enables manufacturers to efficiently select and use materials in a manufacturing process and that also stabilizes the material costs associated with the manufactured goods The invention accordingly comprises the features of construction, combination of elements and arrangement of parts that will be exemplified in the following detailed disclosure, and the scope of the invention will be indicated in the claims. Other features and advantages of the invention will be apparent from the description, the drawings and the claims.

DESCRIPTION OF THE DRAWINGS

For a fuller understanding of the invention, reference is made to the following description taken in conjunction with the accompanying drawings, in which.

DETAILED DESCRIPTION OF THE PREFERRED EMBODIMENTS

Figure 1:
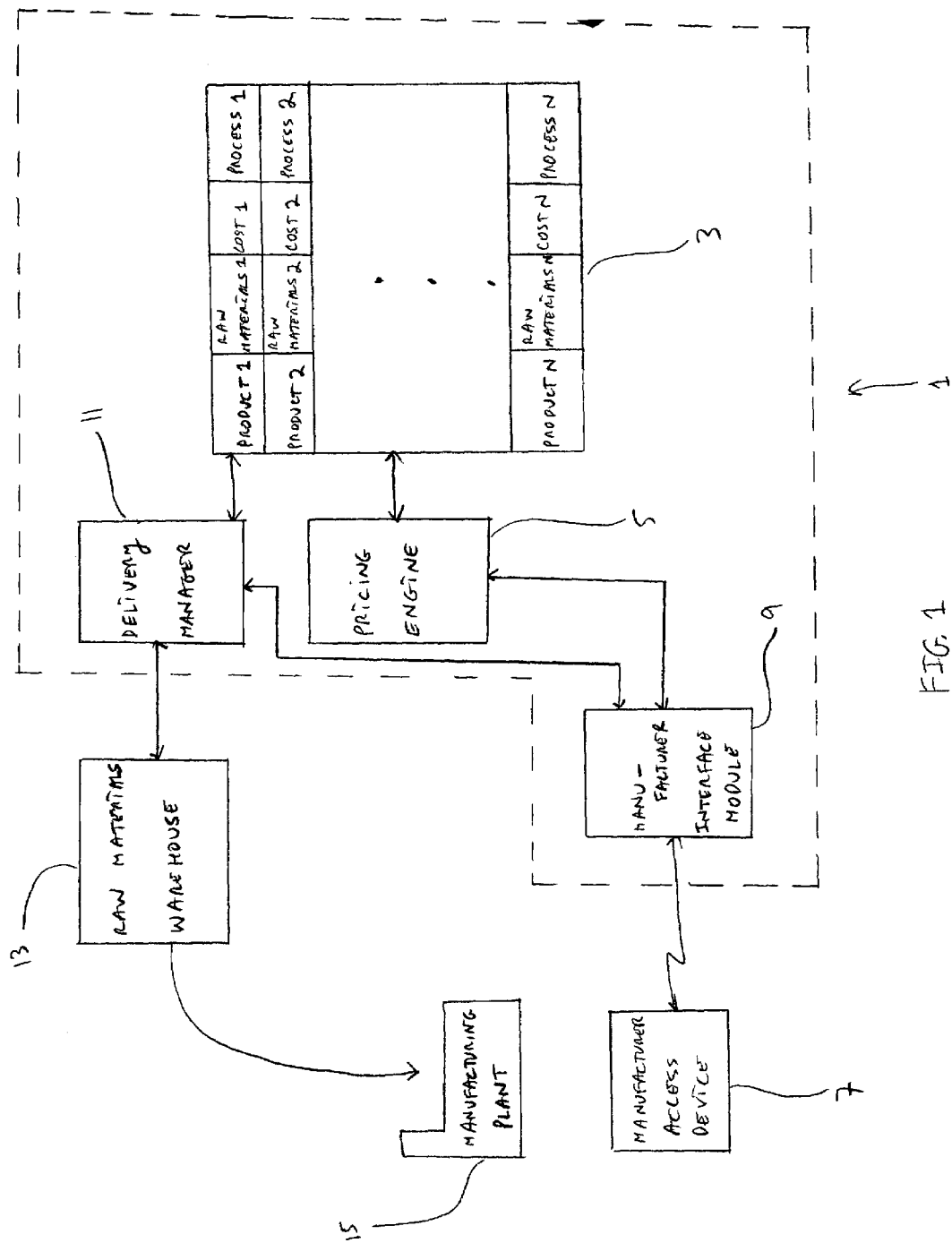
FIG. 1 is a block diagram of a manufacturing process billing system according to the present invention.

Referring now to FIG. 1, there is shown a block diagram of a manufacturing process billing system 1 according to the present invention. System 1 includes a product database 3 that stores information regarding different manufactured products including, but not limited to, the materials that are used to manufacture each product, the cost of such materials and a description of the process used to manufacture each of the products using the materials. In an exemplary embodiment, the process included in product database 3 is an optimum process for manufacturing a particular product given a set of materials wherein such process is the intellectual property of the supplier of the materials.

For example, if system 1 is being applied to improve the efficiency of manufacturing wafers and integrated circuits, then product database 3 will include a list of various products such as DRAMS, processors magnetic thin film heads, photomasks and other microelectronic devices. In addition, product database 3 will include a listing of the materials required to manufacture each of the products. For example, associated with a particular integrated circuit structure, product database 3 will store a material list that includes positive- or negative-working photoresist, developers, anti-reflective coatings, the materials required to manufacture the integrated circuit structure, as well as the amounts of these materials required. Product database 3 also includes a description of a process that is used to manufacture the integrated circuit structure which may be, for example, wafer spin speed for photoresist application, soft-bake times and temperatures, exposure and post-exposure wavelength and doses and development time and temperatures. Finally, product database 3 stores the materials cost required to produce the associated product. In an exemplary embodiment, the material cost is provided on a per-product basis so that system 1 can determine the total cost to produce a number of units of the product.

A manufacturer seeking the cost to manufacture a product on a per-product basis accesses system 1 via a manufacturer access device 7 that may be, by way of non-limiting example, a personal computer that accesses system 1 through the Internet uses well known methods. Upon accessing system 1, access device 7 interfaces with a manufacturer interface module 9 and provides interface module 9 with the pricing request for materials and manufacturing process information to produce a specified quantity of the particular product. Interface module 9 then communicates the manufacturer's pricing request to a pricing engine 5 that in turn searches product database 3 for an entry that matches the particular product. Upon finding a match, pricing engine 5 retrieves the material list required to produce the particular product and the per-unit cost to produce the product given the materials required. Based on the per-unit cost, pricing engine 5 then calculates the total cost to manufacture the specified quantity of the particular product and provides this cost, or an amount that is proportional to the cost to reflect a pricing discount or premium, to manufacturer access device 7 via interface module 9.

If the manufacturer decides to manufacture the specified quantity of the particular product based on the per-unit pricing provided by system 1, the manufacturer issues a purchase request to manufacturer interface module 9 for the materials and manufacturing process information necessary to manufacture the particular product at the per-unit pricing specified. Interface module 9 forwards the purchase request to delivery manager 11. Delivery manager 11 then accesses product database 3 to determine the type and quantity of materials required to manufacture the number of products included in the purchase request. Delivery manager 11 then issues a delivery order to materials warehouse 13 directing materials warehouse 13 to deliver the quantity of materials required to manufacture the specified number of products to a location 15 specified in the purchase request, for example, a manufacturing plant. Thus, system 1 provides the manufacturer with the correct selection and quantity of materials enabling the manufacturer to produce the desired number of products.

Furthermore, delivery manager 11 retrieves from product database 3 the manufacturing process information for the particular product and forwards the information to manufacturer access device 7 via interface module 9. By using the manufacturing process information together with the materials selection supplied by system 1, the manufacturer is assured that it is employing the optimum manufacturing process to produce the desired products.

After receiving the materials from materials warehouse 13, the manufacturer pays for the materials by paying the specified per-unit price multiplied by the number of product units the manufacturer produced. In an exemplary embodiment, payment may be sent electronically to system 1 via manufacturer interface module 9.

System 1 may be implemented by a materials provider for the purpose of streamlining the interaction with its customer base and more efficiently providing its customers with materials and manufacturing process information. Alternatively, system 1 may be implemented by an entity that distributes materials on behalf of a plurality of materials providers. In this embodiment, product database 3 includes a listing of products that are manufactured using materials supplied by the plurality of materials suppliers, together with the per-unit cost of such materials and a description of the manufacturing process used to produce such products. When system 1 receives a purchase request from a manufacturer for materials for producing a particular product, delivery manager 11 communicates with the materials provider that provides the materials required to manufacture the particular product directing the materials provider to ship the required materials to location 15.

In an exemplary embodiment, product database 3 also includes a reference to a tool or piece of equipment necessary to implement the manufacturing process used to produce each particular product listed in product database 3. In this case, when the manufacturer communicates the purchase request to interface module 9, the manufacturer specifies that it also desires to procure the equipment necessary to implement the manufacturing process. Alternatively, interface module 9 may query the manufacturer as to whether it desires to procure the manufacturing equipment as well as the required materials. In either case, delivery manager 11 causes the appropriate equipment, as specified in product database 3, to be delivered to location 15 together with the materials.

In addition to accessing system 1 to determine the cost to manufacture a product on a per-product basis, a manufacturer may access system 1 to determine whether a process exists to accomplish a desired manufacturing objective such as, by way of non-limiting example, the manufacture of a custom chemical product. In this case, the manufacturer provides interface module 9 with a process request that identifies the objectives and results the manufacturer desires to achieve. Interface module 9 then communicates the manufacturer's process request to pricing engine 5 that in turn searches product database 3 for a process that meets the manufacturer's objectives. Upon finding a suitable process, pricing engine 5 retrieves the process, together with the materials list and cost required to implement the process, and provides this information in response to the manufacturer's process request via interface module 9. In addition, other information may be stored in product database 3 and provided to the manufacturer including, but not limited to, the delivery time for the materials needed to perform the process and descriptions of other manufacturing processes that may be of interest to the manufacturer based on the manufacturer's process request. In this way, system 1 may be used by manufacturers to identify custom manufacturing processes for solving specific manufacturing needs.

The present invention may also be applied in contexts other than manufacturing processes such as, by way of non-limiting example, for providing home improvement advice in which a contractor provides system 1 with the dimensions and decor elements for a particular construction project and system 1 provides the contractor with a suggested materials list, layout and preferred construction techniques for completing the project.

Thus, under the present invention, the efficiency of the manufacturing process is improved. First, manufacturers no longer have to use trial an error in selecting the best materials and/or manufacturing process to use because this information is provided to them by the materials providers. Accordingly, manufacturing waste as a result of improper material and process selection is greatly reduced or eliminated. Furthermore, by providing the manufacturers with materials on a per-unit produced price, as opposed to requiring the manufacturers to specify and purchase an amount of materials directly, the manufacturer's budgeting process is greatly simplified. Also, because the selection of the materials and manufacturing process to be used is made by the materials provider, the entity best situated to make such a selection, the materials provider can more efficiently distribute materials by reducing waste resulting from the manufacturer's selection errors. Finally, because the materials provider is being compensated for each product unit produced by the manufacturer using the materials and manufacturing process information supplied by the materials provider, the materials provider's revenue would not be adversely impacted even if it provides the manufacturer with a more efficient manufacturing process that requires less materials to implement.

It will thus be seen that the objects set forth above, among those made apparent from the preceding description, are efficiently attained and, since certain changes may be made in carrying out the above process, in a described product, and in the construction set forth without departing from the spirit and scope of the invention, it is intended that all matter contained in the above description shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

The invention claimed is:

1. A method for improving the efficiency of manufacturing a product, comprising the steps of:
   receiving from a manufacturer a desire to manufacture a number of said products;
   determining an amount of materials required to produce said number of products;
   determining a process for manufacturing said number of products;
   calculating a cost to manufacture said number of products based on said amount of materials and said process;
   providing to said manufacturer said process and said cost to manufacture said number of products.

2. The method of claim 1, further comprising the step of:
   receiving from said manufacturer a payment proportional to said cost to manufacture said number of products.

3. The method of claim 1, further comprising the step of:
   providing said amount of materials to said manufacturer.

4. The method of claim 1, wherein said process requires a tool, said method further comprising the step of:
   providing to said manufacturer said tool.

5. The method of claim 1, wherein said process for manufacturing said number of products is an optimum process.

6. The method of claim 1, wherein said materials is provided by a material provider and said process for manufacturing said number of products is the intellectual property of said materials provider.

7. A system for improving the efficiency of manufacturing a product, comprising:
   a product database storing a plurality of products, said product database including a material list and a process description for manufacturing each of said plurality of products;
   a pricing engine, said pricing engine receiving a manufacturer's desire to manufacture a number of said products, said pricing engine accessing said product database for determining an amount of material, a process and a cost for manufacturing said number of products; and
   a manufacturer interface module, said manufacturer interface module providing to said manufacturer said amount of materials and said process for manufacturing said number of products.

8. The system of claim 7, wherein said manufacturer interface module receives from said manufacturer a payment proportional to said cost to manufacture said number of products.

9. The system of claim 7, further comprising a delivery manager, said delivery manager causing said amount of materials to be delivered to said manufacturer.

10. The system of claim 9, wherein said delivery manager causes a tool required to perform said process to be delivered to said manufacturer.

11. The system of claim 7, wherein said process for manufacturing said number of products is an optimum process.

12. The method of claim 7, wherein said materials is provided by a material provider and said process for manufacturing said number of products is the intellectual property of said materials provider.

* * * * *